United States Patent
Matula et al.

(10) Patent No.: US 10,735,591 B1
(45) Date of Patent: Aug. 4, 2020

(54) CONTACT CENTER ROUTING MECHANISMS

(71) Applicant: Avaya Inc., Santa Clara, CA (US)

(72) Inventors: Valentine C. Matula, Granville, OH (US); Rajagiri Ravi, Pradesh (IN); Bharti Patwari Poorey, Pune (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/295,381

(22) Filed: Mar. 7, 2019

(51) Int. Cl.
*H04M 3/523* (2006.01)
*H04M 3/58* (2006.01)

(52) U.S. Cl.
CPC .......... *H04M 3/5232* (2013.01); *H04M 3/58* (2013.01)

(58) Field of Classification Search
CPC ......... H04M 3/5233; H04M 2203/402; H04M 3/5232
See application file for complete search history.

(56) References Cited

U.S. PATENT DOCUMENTS

| | | | |
|---|---|---|---|
| 2014/0226810 A1* | 8/2014 | Steiner | H04M 3/5233 379/265.12 |
| 2014/0270133 A1* | 9/2014 | Conway | H04M 3/5233 379/265.1 |
| 2016/0182719 A1* | 6/2016 | Skiba | H04M 3/5233 379/265.05 |

* cited by examiner

*Primary Examiner* — Nafiz E Hoque
(74) *Attorney, Agent, or Firm* — Sheridan Ross P.C.

(57) ABSTRACT

Contact centers strive to match the best resource, commonly an agent, with a customer for an interaction, such as telephone call, text exchange, or email exchange. Often the initial best match is not the best match upon a different agent being identified and/or new information being gathered. Therefore, it is often beneficial to take a call routed to an agent, who may or may not have answered the call, and reroute it to a different agent. If the agent has already answered the call, the benefits need to at least exceed the costs associated with the transfer. To avoid creating an unstable or unending re-assessment, if the cost-benefit for a particular routing (or rerouting) calls between agents has reached a Nash Equilibrium, the system is stable and, absent new information, re-evaluation unnecessary.

17 Claims, 6 Drawing Sheets

Fig. 5

CONTACT CENTER ROUTING MECHANISMS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for routing communications to nodes on network and particularly to re-routing such communications.

BACKGROUND

A call is assigned to an agent, who need not be the best agent to handle this call. This agent will continue to take the call forward which may not end up with the best possible outcome had it been taken up by the best possible agent.

SUMMARY

Finding a better matching agent for an interaction that is currently assigned to a sub-optimal agent, until the participants in the interaction cannot be reassigned to improve a particular aspect of the interaction, such a result may or may not be a globally optimum solution, but rather a stable state whereby a best made in light of the other best choices. In other words, a Nash Equilibrium is formed and the system, seeking continuous improvement, cannot be further improved and is, therefore, stable.

An interface or widget on agent desktops engage the most appropriate agent to continue the call, even after it is currently assigned to an agent. In current contact center solutions, the routing process works only until an agent is identified. The agent identification process can continue to run as long as a better agent can be found and assigned. This solution is generic and neutral as it does not cater to special and emergency services where best possible resources need to be engaged at the earliest. A problem results in that the agent identification process ends once agent is selected, although it can continue to find a better matching agent.

Embodiments herein may be particularly beneficial for emergency calls, outage calls, high priority calls like high-end customers and business opportunities where the efficient outcome takes higher precedence over the agent bandwidth utilization.

As will be described herein, embodiments are provided to find a better matching agent for a customer interaction that already has been assigned to a sub-optimal agent, even if that agent was selected as an optimal agent at the time of initial routing. The solution is based on game theory principle of Nash Equilibrium.

By definition, Nash Equilibrium is a stable state of a system involving the interaction of different participants, in which no participant can gain by a unilateral change of strategy if the strategies of the others remain unchanged.

Participants & their Strategies:
1. Customer: Effective resolution in the call.
2. Contact Center: Efficient First call resolution.
3. Agent strategy: Accuracy+Time.

Better matched agent: The preferred choice by the routing strategy, had this agent been available.

Sub-optimal agent: route-selected sub-optimal agent as better matched agent is not available.

Note: A sub-optimal agent for one customer can be a better matched agent for another customer and vice-versa.

Handling the problem scenarios:

1. An interaction is routed to sub-optimal agent and ringing on his station. Meanwhile, a better matching agent becomes available. As the call is not yet answered, deflecting the call to better matching agent will be the best strategy to form the equilibrium 2. A call is routed to sub-optimal agent and the agent answered the call. The call is in progress. As the call is in progress, depending on the breakpoint/milestones, transitioning the call from suboptimal agent to better matching agent to from the equilibrium.

This may consume bandwidth of two agents simultaneously for few seconds, however it is acceptable because the core of the proposal is to handle the calls where efficient outcome is evidently critical than the agent's bandwidth.

For instance:
Emergency call such as a fire alarm in an apartment
Converting anticipated business opportunity to sales
Dealing with a high-end customer
Dealing a product outage Should a Nash Equilibrium not be formed, then the contact center can choose the following strategy:

a. Sub-optimal agent desktop will get an interface/widget popped up with option to engage a better matching agent along with timer.

b. The system may select a different, more optimal, agent for the interaction and enqueue the connection for that agent to reserve the agent and automatically connect to the more optimal agent when available. If the more optimal agent is not yet available, the sub-optimal agent may continue to with the interaction and have the system join the more optimal agent when available.

c. The better matching agent desktop will get an interface/widget popped up showcasing reserved status. He/she has an option to barge into the call and sub-optimal agent's desktop user interface.

The customer experience is preserved by seamless transition by means of conferencing from sub-optimal agent to better matching agent such that the customer won't be put on hold while handing over the call.

Inputs into assessing current call can be any or all of those currently available, including but not limited to, analytics module, agent self-assessment, a silent monitoring supervisor who ranks the call, customer input via separate co-browsing/digital interface, etc.

These and other needs are addressed by the various embodiments and configurations of the present invention. The present invention can provide a number of advantages depending on the particular configuration. These and other advantages will be apparent from the disclosure of the invention(s) contained herein.

In one embodiment, a system is disclosed, comprising: a microprocessor, comprising a memory to maintain machine instructions for the microprocessor and data; and a network interface; and the microprocessor performs: accessing a first interaction comprising a customer communication device via the network interface to a network; determining an attribute of the first interaction; selecting a resource from a plurality of resources that best matches the attribute of the first interaction; routing the first interaction to a communication device associated with the selected resource; a first scoring, comprising a cost-benefit of the first interaction continuing with the selected resource; a second scoring, comprising a cost-benefit analysis of the first interaction if transferred to a different resource of the plurality of resources; and upon determining that the first scoring and second scoring indicate an improved cost-benefit analysis if the first interaction is transferred to the different resource, routing the interaction to the different resource.

In another embodiment, a method is disclosed, comprising: accessing a first interaction comprising a customer communication device via a network; determining an attribute of the first interaction; selecting a resource from a plurality of resources that best matches the attribute of the first interaction; routing the first interaction to a communication device associated with the selected resource; a first scoring, comprising a cost-benefit of the first interaction continuing with the selected resource; a second scoring, comprising a cost-benefit analysis of the first interaction if transferred to a different resource of the plurality of resources; and upon determining that the first scoring and second scoring indicate an improved cost-benefit analysis if the first interaction is transferred to the different resource, routing the interaction to the different resource.

In another embodiment, a system, comprising: means to access a first interaction comprising a customer communication device; means to determine an attribute of the first interaction; means to select a resource from a plurality of resources that best matches the attribute of the first interaction; means to route the first interaction to a communication device associated with the selected resource; means to perform a first scoring, comprising a cost-benefit of the first interaction continuing with the selected resource; means to perform a second scoring, comprising a cost-benefit analysis of the first interaction if transferred to a different resource of the plurality of resources; and means to determine that the first scoring and second scoring indicate an improved cost-benefit analysis if the first interaction is transferred to the different resource, and in response thereto, means to route the interaction to the different resource.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
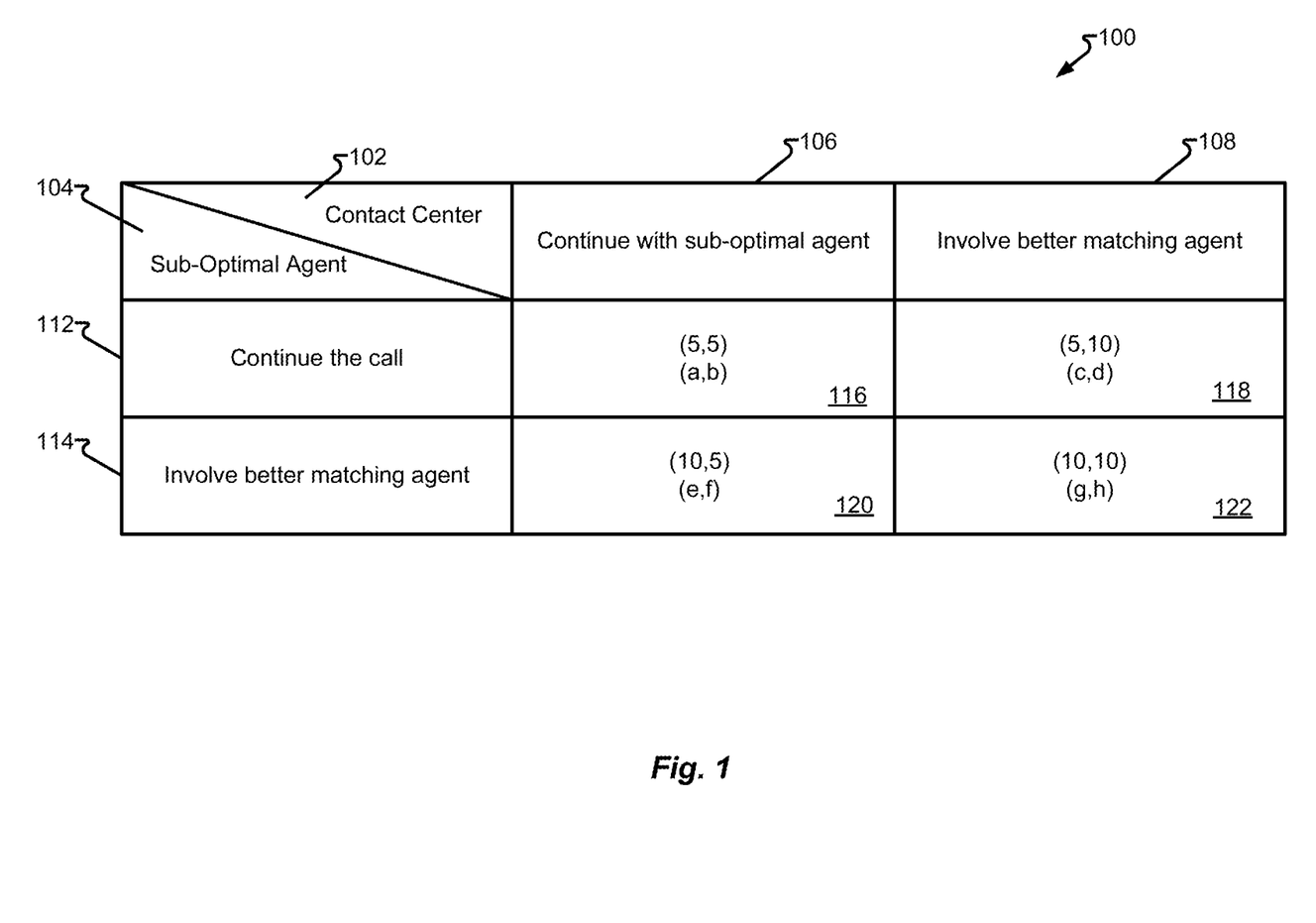
FIG. 1 depicts a Nash Equilibrium payoff matrix in accordance with embodiments of the present disclosure.

FIG. 1 depicts Nash Equilibrium payoff matrix 100 in accordance with embodiments of the present disclosure. In one embodiment, matrix 100 depicts a Nash Equilibrium for a scenario where a call is assigned to a sub-optimal agent and there is an improvement in the benefit to involving the better matching agent. The sub-optimal agent is aware of the fact that a better matching agent is available to handle the call and sub-optimal agent is aware that the better matching agent is the right fit to take the call forward. Contact center options are identified in the upper portion of matrix 100, including heading 102 and column titles for columns 106 and 108. Sub-optimum agent options are identified in the left portion of matrix 100, including heading 104 and row titles for rows 112 and 114.

Column 106 illustrates options "b," in cell 116, and option "f," in cell 120, and the available scores (both 5) that the contact center achieves by leaving the call with sub-optimal agent.

Row 112 illustrations options "a", in cell 116, and option "c," in cell 118, and the available scores (both 5) that the sub-optimal agent achieves by continuing with the call.

Column 108 illustrations option "d," in cell 118, and option "h," in cell 122, and the available scores (both 10) that the contact center achieves by involving the better matching agent on call.

Row 114 illustrates options "e," in cell 120, and option "g," in cell 122 and the available scores (both 10) that the sub-optimal agent achieves on involving the better matching agent on call.

Figure 2A:
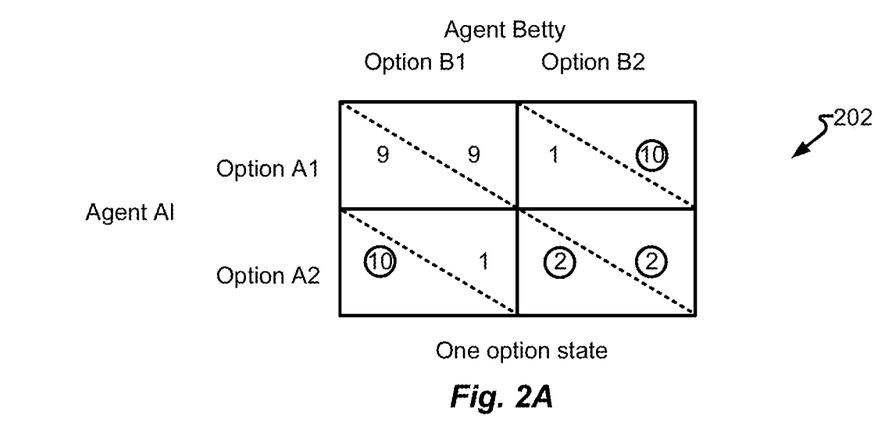
FIGS. 2A-B depict a first and second Nash Equilibrium payoff matrixes in accordance with embodiments of the present disclosure.
Figure 2B:
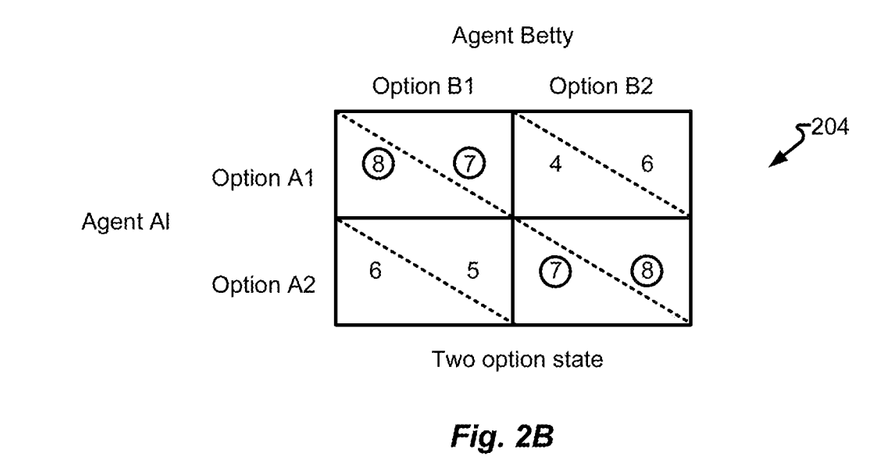

FIGS. 2A-B depict Nash Equilibrium payoff matrixes 202 and 203 in accordance with embodiments of the present disclosure. Generally, a Nash Equilibrium occurs when competing objectives cannot be unilaterally improved by selecting a different option. In other words, if two competing objectives cannot be further improved by one objective changing a state, in view of the potential for the second objective to change state, then a Nash Equilibrium has been achieved. If a change in one state, such as to improve one objective, places the other objective in a state whereby another option would result in an improvement, the other objective may be selected. If this continues indefinitely, whereby each combination of states may be discarded for another combination, then no Nash Equilibrium is present. However, if one combination does result in a stable state, there may be one or more such combinations. In the case where all values are identical, a Nash Equilibrium would be present for all options.

In one embodiment, calls are being considered to be routed to one of two agents (e.g., Agent Al and Agent Betty). Agent Al may implement option A1 (a first call) or option A2 (a second call) however, Agent Betty may implement option B2 (a third call) or option B2 (a fourth call). A ranking of suitability, matching, cost-benefit, or other scoring is provided for each combination. Matrix 202 illustrates one Nash Equilibrium is formed, when Agent Al implements option A2 and Agent Betty implements option B2. While a globally better option may be available (e.g., the upper left quadrant where each option provides a higher result, the selection of this quadrant is not stable and, therefore, not a Nash Equilibrium).

In another embodiment, illustrated by matrix 204, wherein two Nash Equilibria are provided (upper left and lower right quadrant).

Figure 3:
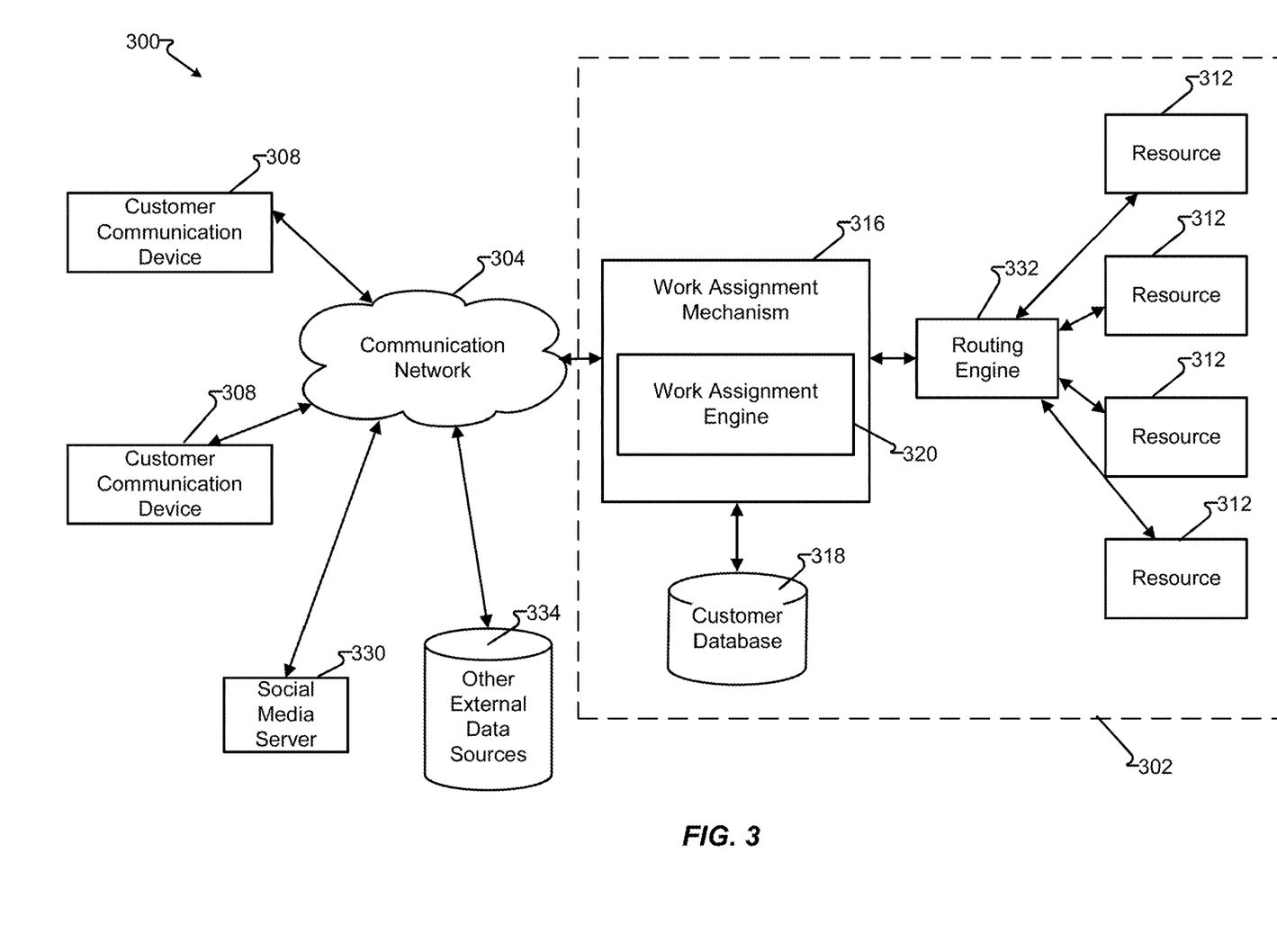
FIG. 3 depicts a system in accordance with embodiments of the present disclosure.

With reference now to FIG. 3, communication system 300 is discussed in accordance with at least some embodiments of the present disclosure. The communication system 300 may be a distributed system and, in some embodiments, comprises a communication network 304 connecting one or more communication devices 308 to a work assignment mechanism 316, which may be owned and operated by an enterprise administering contact center 302 in which a plurality of resources 312 is distributed to handle incoming work items (in the form of contacts) from customer communication devices 308.

Contact center 302 is variously embodied to receive and/or send messages that are or are associated with work items and the processing and management (e.g., scheduling, assigning, routing, generating, accounting, receiving, monitoring, reviewing, etc.) of the work items by one or more resources 312. The work items are generally generated and/or received requests for a processing resource 312 embodied as, or a component of, an electronic and/or electromagnetically conveyed message. Contact center 302 may include more or fewer components than illustrated and/or provide more or fewer services than illustrated. The border indicating contact center 302 may be a physical boundary (e.g., a building, campus, etc.), legal boundary (e.g., company, enterprise, etc.), and/or logical boundary (e.g., resources 312 utilized to provide services to customers for a customer of contact center 302).

Furthermore, the border illustrating contact center 302 may be as-illustrated or, in other embodiments, include alterations and/or more and/or fewer components than illustrated. For example, in other embodiments, one or more of resources 312, customer database 318, and/or other component may connect to routing engine 332 via communication network 304, such as when such components connect via a public network (e.g., Internet). In another embodiment, communication network 304 may be a private utilization of, at least in part, a public network (e.g., VPN); a private network located, at least partially, within contact center 302; or a mixture of private and public networks that may be utilized to provide electronic communication of components described herein. Additionally, it should be appreciated that components illustrated as external, such as social media server 330 and/or other external data sources 334 may be within contact center 302 physically and/or logically, but still be considered external for other purposes. For example, contact center 302 may operate social media server 330 (e.g., a website operable to receive user messages from customers and/or resources 312) as one means to interact with customers via their customer communication device 308.

Customer communication devices 308 are embodied as external to contact center 302 as they are under the more direct control of their respective user or customer. However, embodiments may be provided whereby one or more customer communication devices 308 are physically and/or logically located within contact center 302 and are still considered external to contact center 302, such as when a customer utilizes customer communication device 308 at a kiosk and attaches to a private network of contact center 302 (e.g., WiFi connection to a kiosk, etc.), within or controlled by contact center 302.

It should be appreciated that the description of contact center 302 provides at least one embodiment whereby the following embodiments may be more readily understood without limiting such embodiments. Contact center 302 may be further altered, added to, and/or subtracted from without departing from the scope of any embodiment described herein and without limiting the scope of the embodiments or claims, except as expressly provided.

Additionally, contact center 302 may incorporate and/or utilize social media web site 330 and/or other external data sources 334 may be utilized to provide one means for a resource 312 to receive and/or retrieve contacts and connect to a customer of a contact center 302. Other external data sources 334 may include data sources, such as service bureaus, third-party data providers (e.g., credit agencies, public and/or private records, etc.). Customers may utilize their respective customer communication device 308 to send/receive communications utilizing social media server 330.

In accordance with at least some embodiments of the present disclosure, the communication network 304 may comprise any type of known communication medium or collection of communication media and may use any type of protocols to transport electronic messages between endpoints. The communication network 304 may include wired and/or wireless communication technologies. The Internet is an example of the communication network 304 that constitutes an Internet Protocol (IP) network consisting of many computers, computing networks, and other communication devices located all over the world, which are connected through many telephone systems and other means. Other examples of the communication network 304 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 304 need not be limited to any one network type and instead may be comprised of a number of different networks and/or network types. As one example, embodiments of the present disclosure may be utilized to increase the efficiency of a grid-based contact center 302. Examples of a grid-based contact center 302 are more fully described in U.S. Patent Publication No. 2010/0296417 to Steiner, the entire contents of which are hereby incorporated herein by reference. Moreover, the communication network 304 may comprise a number of different communication media, such as coaxial cable, copper cable/wire, fiber-optic cable, antennas for transmitting/receiving wireless messages, and combinations thereof.

The communication devices 308 may correspond to customer communication devices. In accordance with at least some embodiments of the present disclosure, a customer may utilize their communication device 308 to initiate a work item. Illustrative work items include, but are not limited to, a contact directed toward and received at a contact center 302, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 304. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 316, but rather may be on some other server in the communication network 304 where it is harvested by the work assignment mechanism 316, which generates a work item for the harvested communication, such as social media server 330. An example of such a harvested communication includes a social media communication that is harvested by the work assignment mechanism 316 from a social media network or server 330. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 308 and the format of the communication. In particular, work items are logical representations within a contact center 302 of work to be performed in connection with servicing a communication received at contact center 302 (and, more specifically, the work assignment mechanism 316). The communication may be received and maintained at the work assignment mechanism 316, which may be, or utilizes, a switch or server connected to the work assignment mechanism 316, or the like, until a resource 312 is assigned to the work item representing that communication. At which point, the work assignment mechanism 316 passes the work item to a routing engine 332 to connect the communication device 308, which initiated the communication, with the assigned resource 312.

Although the routing engine 332 is depicted as being separate from the work assignment mechanism 316, the routing engine 332 may be incorporated into the work assignment mechanism 316 or its functionality may be executed by the work assignment engine 320.

In accordance with at least some embodiments of the present disclosure, the communication devices 308 may comprise any type of known communication equipment or collection of communication equipment. Examples of a suitable communication device 308 include, but are not limited to, a personal computer, laptop, Personal Digital Assistant (PDA), cellular phone, smart phone, telephone, or combinations thereof. In general, each communication device 308 may be adapted to support video, audio, text, and/or data communications with other communication devices 308 as well as the processing resources 312. The type of medium used by the communication device 308 to communicate with other communication devices 308 or processing resources 312 may depend upon the communication applications available on the communication device 308.

In accordance with at least some embodiments of the present disclosure, the work item is sent toward a collection of processing resources 312 via the combined efforts of the work assignment mechanism 316 and routing engine 332. The resources 312 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 302.

As discussed above, the work assignment mechanism 316 and resources 312 may be owned and operated by a common entity in a contact center 302 format. In some embodiments, the work assignment mechanism 316 may be administered by multiple enterprises, each of which has its own dedicated resources 312 connected to the work assignment mechanism 316.

In some embodiments, the work assignment mechanism 316 comprises a work assignment engine 320, which enables the work assignment mechanism 316 to make intelligent routing decisions for work items. In some embodiments, the work assignment engine 320 is configured to administer and make work assignment decisions in a queueless contact center 302, as is described in U.S. patent application Ser. No. 12/882,950, the entire contents of which are hereby incorporated herein by reference. In other embodiments, the work assignment engine 320 may be configured to execute work assignment decisions in a traditional queue-based (or skill-based) contact center 102.

The work assignment engine 320 and its various components may reside in the work assignment mechanism 316 or in a number of different servers or processing devices. In some embodiments, cloud-based computing architectures can be employed whereby one or more components of the work assignment mechanism 316 are made available in a cloud or network such that they can be shared resources among a plurality of different users. Work assignment mechanism 316 may access customer database 318, such as to retrieve records, profiles, purchase history, previous work items, and/or other aspects of a customer known to contact center 302. Customer database 318 may be updated in response to a work item and/or input from resource 312 processing the work item.

It should be appreciated that one or more components of contact center 302 may be implemented in a cloud-based architecture in their entirety, or components thereof (e.g., hybrid), in addition to embodiments being entirely on-premises. In one embodiment, customer communication device 308 is connected to one of resources 312 via components entirely hosted by a cloud-based service provider, wherein processing and data storage elements may be dedicated to the operator of contact center 302 or shared or distributed amongst a plurality of service provider customers, one being contact center 302.

In one embodiment, a message is generated by customer communication device 308 and received, via communication network 304, at work assignment mechanism 316. The message received by a contact center 302, such as at the work assignment mechanism 316, is generally, and herein, referred to as a "contact." Routing engine 332 routes the contact to at least one of resources 312 for processing.

Figure 4A:
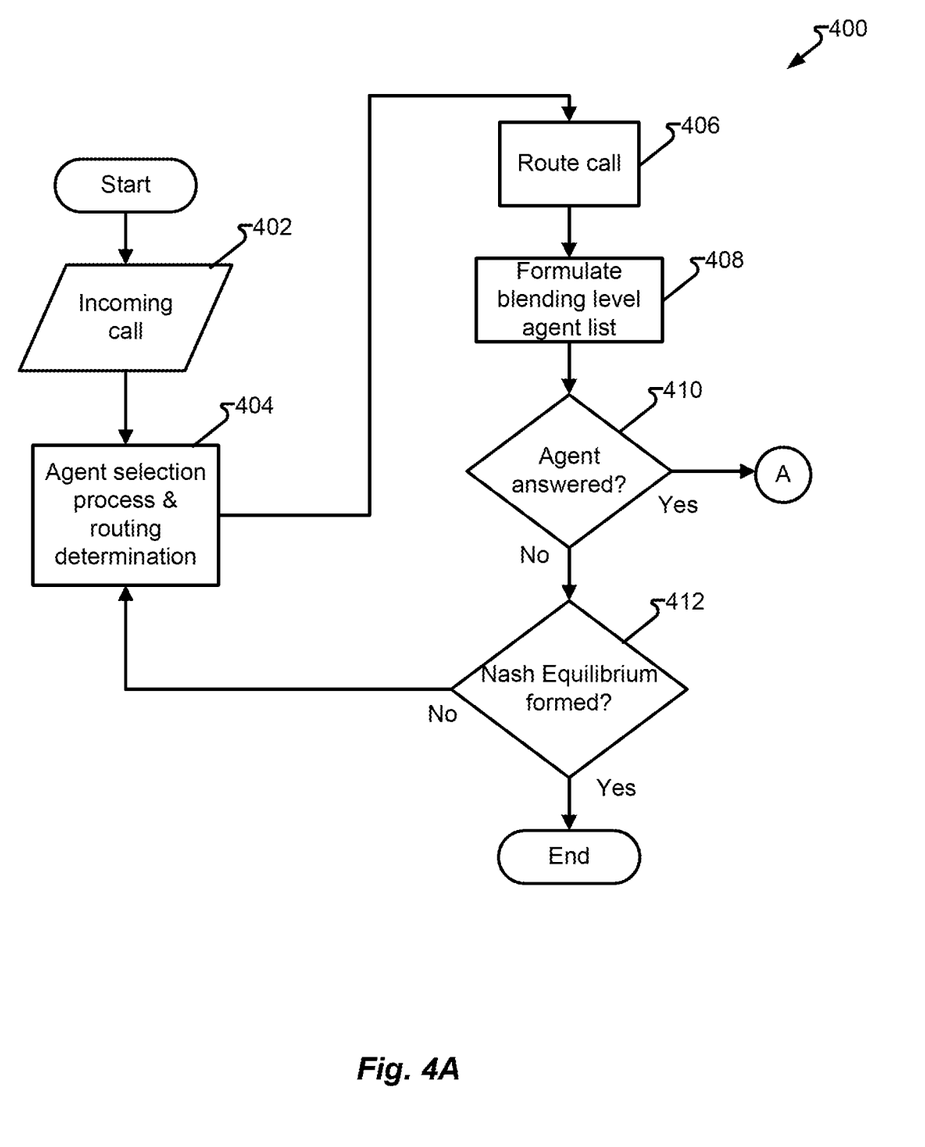
FIG. 4A-B depict a first process in accordance with embodiments of the present disclosure.
Figure 4B:
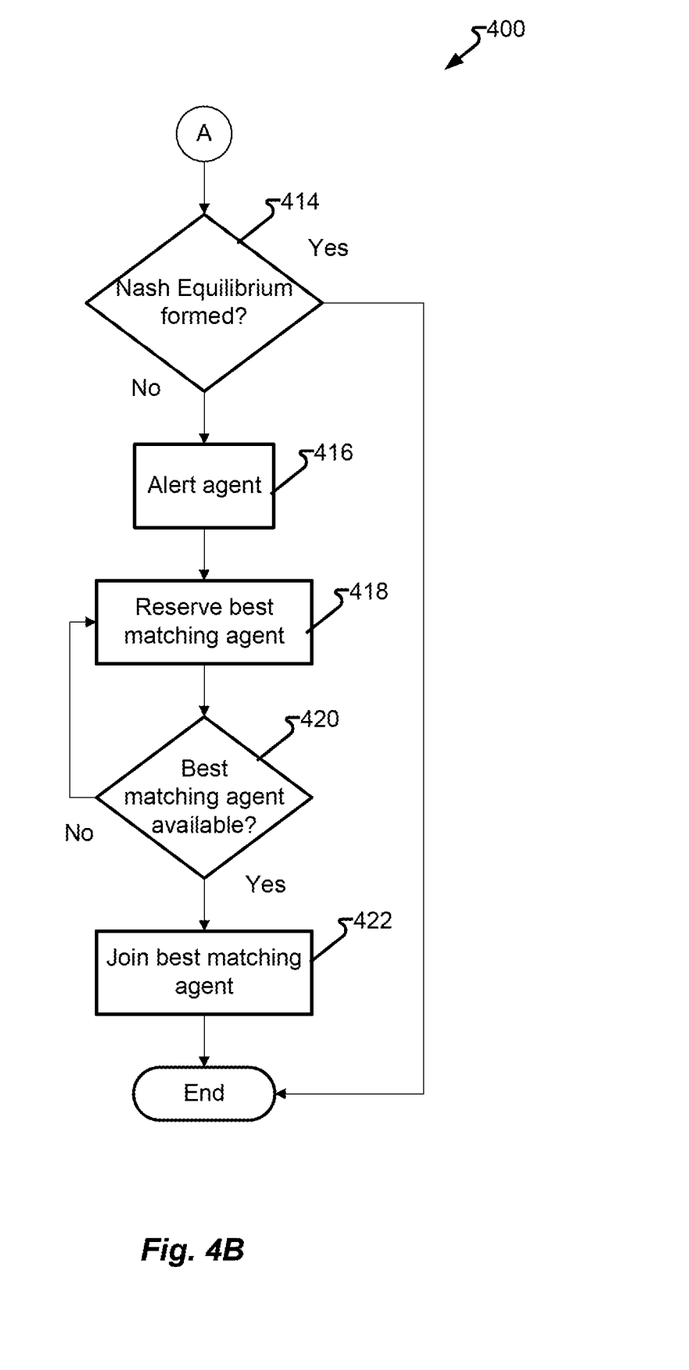

FIG. 4A-B depict a process 400 in accordance with embodiments of the present disclosure. In one embodiment, process 400 begins and an incoming call is received in step 402. Additionally or alternatively, step 402 may make a routing decision for an outbound call that may be placed as a portion of step 402, step 406, or a unique step of process 400. Next, step 404 selects an agent to receive the call (e.g., one of resources 312) and, in step 406, routes the call to the selected agent's communication device and/or queue. Step 406 may route the call to the best, currently available agent, which may be further selected based on information currently known which may change as the call progresses.

In another embodiment, step 408 formulates a blending level agent list. In one embodiment, the cost-benefit analysis for a number of agents is determined with respect to the value they can contribute to the call. In another embodiment, the cost associated with transferring a call from one agent to another may be included. For example, a five percent additional cost may be incurred for a first transfer and, therefore, implementing a transfer should at least result in more than a five percent improvement in the benefit. In another example, should a subsequent transfer to a third agent be contemplated, a different value, such as a forty percent additionally cost, may be associated with such a transfer and, therefore, require an improvement in the benefit of no less than forty percent.

Costs and benefit are variously embodied. In one embodiment, the benefit may be an estimated time to close an issue, estimated sale amount, and/or other benefit that may be realized. In another embodiment, a cost may be a likelihood of a customer abandoning the call, terminating business, reducing a purchase amount, cost differential from one agent to another agent, etc. The cost of abandonment and/or business termination may be based on lost business associated with an average customer or, if known, the particular customer engaged in the call. Transferring a customer's call from one agent to another, even in the most ideal circumstances, increase customer frustration and the likelihood they will become dissatisfied and/or abandon the call. Customer frustration increases with time spent on hold waiting for the new agent to answer the transfer.

Test 410 determines if the agent selected in step 404 has answered the call and, if yes, processing continues to step 414 and, if no, processing continues to step 412. Step 412 determines if a Nash Equilibrium has been formed and, if yes, process 400 may end without further modification to the current call-agent assignments. If no, processing continues to step 404 whereby another agent is selected for routing in step 404. Step 412 may also utilize a determination if ring time is less than the average wait time, as well as whether the best matched agent has been assigned utilizing the Nash Equilibrium and a selected scoring.

In FIG. 4B, which is executed upon test 410 determining that an agent has answered the call. Test 414 determines if a Nash Equilibrium has been created, which may also consider if the talk time is less than the threshold time to transfer the call and/or if there is sufficient advantage (e.g., at least a 5% increase in benefit over the associated cost). If test 414 is determined in the affirmative, process 400 may end. If test 414 is determined in the negative, processing may continue to step 416 whereby the agent currently engaged in the call is alerted of the pending transfer to a second agent. Step 418 reserves a slot in the second agent's queue, which may preferably be the first waiting spot such that the second agent, upon completing their current call, is connected to the current interaction. Test 420 determines if the best matching agent is currently available and, if not, loops back to step 418 to re-select a different second agent. If test 420 is determined in the affirmative, step 422 may then automatically connect the second agent to the call. As an option, the first agent (the agent selected in step 404) discovers a need to not have the call transferred, they may signal the routing mechanism (e.g., work assignment mechanism 316 and/or work assignment engine 322) to omit rerouting the call.

Figure 5:
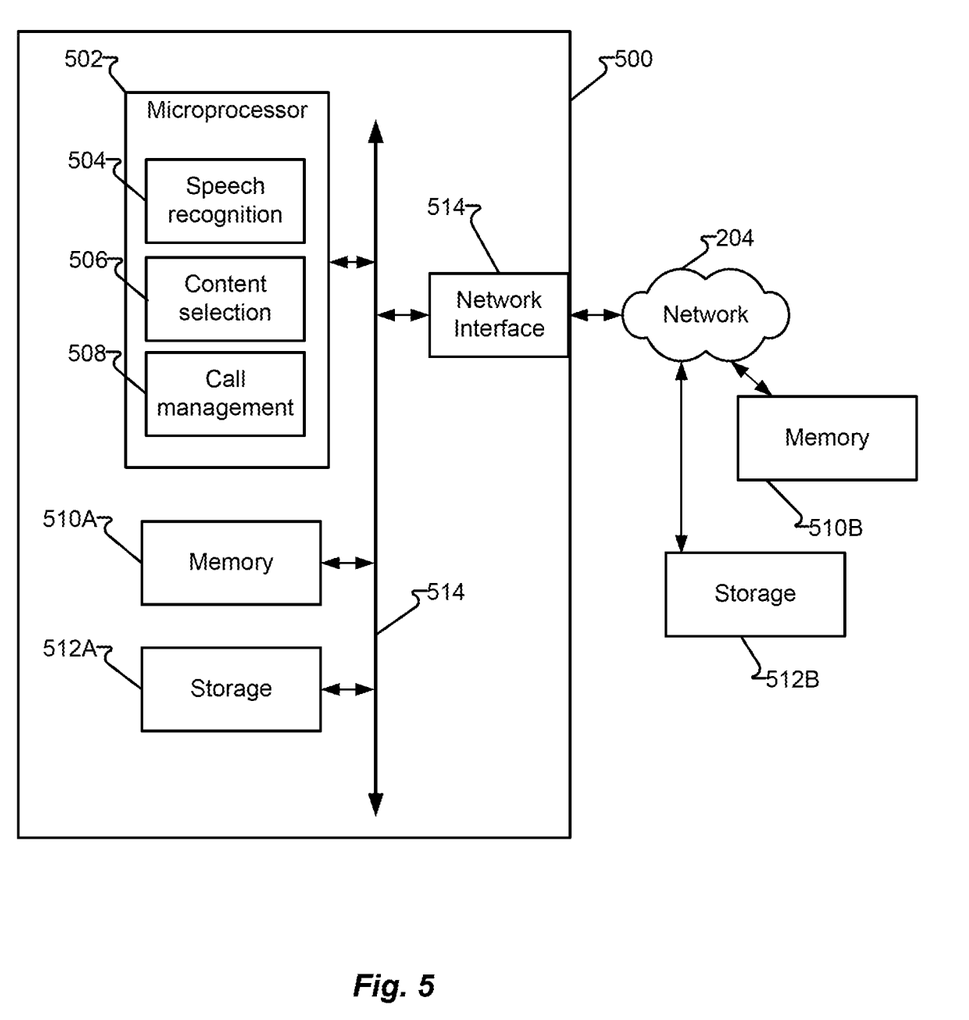
FIG. 5 depicts a server in accordance with embodiments of the present disclosure.

FIG. 5 depicts server 500 in accordance with embodiments of the present disclosure. Server 500 may be utilized to execute 400 and/or one or more of work assignment mechanism 316 and/or work assignment engine 320.

It should be appreciated that server 500 may comprise the addition of or omission of certain components, which may be deployed on a different server or other computing device or devices. Server 500 may comprise microprocessor 502 configured, via wiring, circuitry, instructions or a combination thereof, to perform the operations described herein and optionally other operations. Server 500 may comprise speech recognition 504 which may be utilized to receive waveforms, such as customer communication device 308 and/or resource 312 and convert the waveform into machine inputs and thereby enable microprocessor 502 to be process voice inputs. For example, microprocessor 502 may determine that speech between a particular customer, utilizing a corresponding customer communication device 308, and an agent, utilizing a particular agent communication device (e.g., forming one embodiment of resource 112) has conveyed additional information regarding the purpose of a call and thereby impact the scoring of a current agent versus other agents, such as in step 420. Additionally or alternatively, server 500 and speech recognition 504 may determine that a call is not proceeding well, such as upon the occurrence (or number of occurrence) of a particular word or phrase occurring in the call (e.g., "that doesn't help, "I don't you understand," etc.). As a further embodiment, server 500 and speech recognition 504 may determine that a call is progressing well, such as by determine a particular word or phrase occurring in the call (e.g., "Yes!" "That's what I needed," "Now I understand," etc.).

Content selection 506 may determine and/or select appropriate business logic, such as to determine the particular cost-benefit scoring utilized in a Nash Equilibrium, attributes about a customer or reason for a call (e.g., high value customer, customer has missed three payments, etc.), manage call queues, etc. Agents may have attributes, such as demographic (e.g., gender, dialect, foreign language abilities, age, etc.) that may be better suited for an attribute for a particular customer or call type. For example, customers may be more at ease with someone who is more similar to themselves for certain types of transactions (e.g., applying for a first credit card, changing a retirement account, etc.). However, for different types of transactions, customers may prefer someone less like them (e.g., males seeking assistance from females for clothing purchases, younger people opening a retirement account from an older person, etc.). Attributes regarding the transaction may also be an input into an agent selection, for example, a customer making a high-value purchase may appreciate an agent having an attribute associated with a high level of formality (e.g., metered speaking pace, lower tone, calm, etc.) whereas a low-value purchase may have less formality (e.g., whimsical, adventurous, etc.). Additionally or alternatively, an agent's past results may be utilized as an attribute for a particular call. For example, one agent may do well selling a particular product, answering a particular type of question, or dealing with customers having a particular attribute. For example, if a customer is upset the call may be routed to an agent who has an attribute associated with a more favorable outcome with prior upset customers.

Call management 508 may be utilized to connect, disconnect, transfer, place on/off hold, etc. communications over network 304. However, it should be appreciated that other components may be utilized to provide call management services.

Microprocessor may utilize memory 510 for the storage of data and instructions and/or storage 512. Additionally or alternatively, memory 510 may comprise local memory 510A connected to bus 514 or remote memory 510B connected via network interface 514, which may further be connected to network 304. Similarly, storage 512 may comprise local storage 512A and/or remote storage 512B.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a microprocessor, comprising a memory to maintain machine instructions for the microprocessor and data; and
a network interface; and
wherein the microprocessor performs:
accessing a first interaction comprising a customer communication device via the network interface to a network;
determining an attribute of the first interaction;
selecting a resource from a plurality of resources that best matches the attribute of the first interaction;
routing the first interaction to a communication device associated with the selected resource;
a first scoring comprising a cost-benefit of the first interaction continuing with the selected resource;
a second scoring comprising a cost-benefit analysis of the first interaction if transferred to a different resource of the plurality of resources; and
upon determining that the first scoring and second scoring indicate an improved cost-benefit analysis if the first interaction is transferred to the different resource over maintaining the first interaction with first resource, routing the interaction to the different resource; and
wherein the determination that the first scoring and second scoring indicate the improved cost-benefit analysis if the first interaction is transferred to the different resource comprises determining that a Nash Equilibrium is created by transferring the first interaction to the different resource.

2. The system of claim 1, wherein the determination that the first scoring and second scoring indicate the improved cost-benefit analysis if the first interaction is transferred to the different resource, comprises reselecting a replacement resource, of the plurality of resources, as the selected resource.

3. The system of claim 2, wherein replacement resource is the same as the selected resource.

4. The system of claim 1, further comprising, upon determining that the first scoring and second scoring do not indicate the improved cost-benefit analysis if the first interaction is transferred to the different resource, maintaining the interaction with the selected resource.

5. The system of claim 4, wherein the determination that the first scoring and second scoring do not indicate the improved cost-benefit analysis if the first interaction is maintained with the selected resource, comprises determining that a Nash Equilibrium is created by maintaining the first interaction with the selected resource.

6. The system of claim 1, wherein the determination that the first scoring and second scoring indicate the improved cost-benefit analysis if the first interaction is transferred to the different resource, comprises determining that a benefit of transferring the interaction to the different resource is greater than an overhead cost associated with transferring the interaction to the different resource.

7. A method, comprising:
accessing a first interaction comprising a customer communication device via a network;
determining an attribute of the first interaction;
selecting a resource from a plurality of resources that best matches the attribute of the first interaction;
routing the first interaction to a communication device associated with the selected resource;
a first scoring, the first scoring comprising a cost-benefit of the first interaction continuing with the selected resource;
a second scoring, the second scoring comprising a cost-benefit analysis of the first interaction if transferred to a different resource of the plurality of resources; and
upon determining that the first scoring and second scoring indicate an improved cost-benefit analysis if the first interaction is transferred to the different resource over maintaining the first interaction with first resource, routing the interaction to the different resource; and
wherein the determination, that the first scoring and second scoring indicate the improved cost-benefit analysis if the first interaction is transferred to the different resource, comprises determining that a Nash Equilibrium is created by transferring the first interaction to the different resource.

8. The method of claim 7, wherein the determination that the first scoring and second scoring indicate the improved cost-benefit analysis if the first interaction is transferred to the different resource, comprises reselecting a replacement resource, of the plurality of resources, as the selected resource.

9. The method of claim 8, wherein replacement resource is the same as the selected resource.

10. The method of claim 7, further comprising, upon determining that the first scoring and second scoring do not indicate the improved cost-benefit analysis if the first interaction is transferred to the different resource, maintaining the interaction with the selected resource.

11. The method of claim 10, wherein the determination that the first scoring and second scoring do not indicate the improved cost-benefit analysis if the first interaction is maintained with the selected resource, comprises determining that a Nash Equilibrium is created by maintaining the first interaction with the selected resource.

12. The method of claim 7, wherein the determination that the first scoring and second scoring indicate the improved cost-benefit analysis if the first interaction is transferred to the different resource, comprises determining that a benefit of transferring the interaction to the different resource is greater than an overhead cost associated with transferring the interaction to the different resource.

13. A system, comprising:
means to access a first interaction comprising a customer communication device;
means to determine an attribute of the first interaction;
means to select a resource from a plurality of resources that best matches the attribute of the first interaction;
means to route the first interaction to a communication device associated with the selected resource;
means to perform a first scoring comprising a cost-benefit of the first interaction continuing with the selected resource;
means to perform a second scoring comprising a cost-benefit analysis of the first interaction if transferred to a different resource of the plurality of resources; and
means to determine that the first scoring and second scoring indicate an improved cost-benefit analysis if the first interaction is transferred to the different resource over maintaining the first interaction with first resource, and in response thereto, means to route the interaction to the different resource; and
wherein the means to determine that the first scoring and second scoring indicate the improved cost-benefit analysis if the first interaction is transferred to the different resource further comprise means to determine that a Nash Equilibrium is created by transferring the first interaction to the different resource.

14. The system of claim 13, wherein the means to determine that the first scoring and second scoring indicate the improved cost-benefit analysis if the first interaction is transferred to the different resource, comprise means to reselect a replacement resource, of the plurality of resources, as the selected resource.

15. The system of claim 13, wherein the means to determine that the first scoring and second scoring do not indicate the improved cost-benefit analysis if the first interaction is transferred to the different resource, further comprise means to maintain the interaction with the selected resource.

16. The system of claim 15, wherein the means to determine that the first scoring and second scoring do not indicate the improved cost-benefit analysis if the first interaction is maintained with the selected resource, further comprise means to determine that a Nash Equilibrium is created by maintaining the first interaction with the selected resource.

17. The system of claim 13, wherein the means to determine that the first scoring and second scoring indicate the improved cost-benefit analysis if the first interaction is transferred to the different resource, further comprise means to determine that a benefit of transferring the interaction to the different resource is greater than an overhead cost associated with transferring the interaction to the different resource.

* * * * *